REDUCTION OF DISTORTION IN AMPLIFYING SYSTEMS

Filed Aug. 9, 1952 4 Sheets-Sheet 1

INVENTOR.
ROBERT RUBEN PERLMAN
Robert Ruben Perlman

Sept. 24, 1957 R. R. PERLMAN 2,807,665

REDUCTION OF DISTORTION IN AMPLIFYING SYSTEMS

Filed Aug. 9, 1952 4 Sheets-Sheet 2

*INVENTOR.*

ROBERT RUBEN PERLMAN

Robert Ruben Perlman

REDUCTION OF DISTORTION IN AMPLIFYING SYSTEMS

Filed Aug. 9, 1952 4 Sheets-Sheet 3

INVENTOR.
ROBERT RUBEN PERLMAN
Robert Ruben Perlman

*INVENTOR.*
ROBERT RUBEN PERLMAN
Robert Ruben Perlman

United States Patent Office 2,807,665

Patented Sept. 24, 1957

2,807,665

REDUCTION OF DISTORTION IN AMPLIFYING SYSTEMS

Robert Ruben Perlman, New York, N. Y.

Application August 9, 1952, Serial No. 303,591

3 Claims. (Cl. 179—1)

Figure 1A:
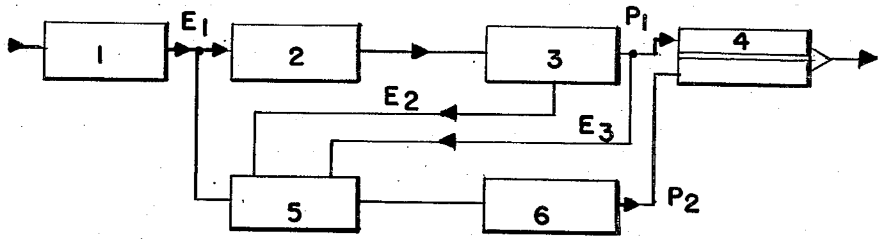

This invention relates to all types of power amplifiers, vacuum tube, transistor, magnetic, and other types of amplifying systems, used for voice, music, and communications, as well as for certain types of controllers and actuators. The circuits shown are for vacuum tube amplifiers in the audio range, but the principles are applicable to other uses as well.

In vacuum tube amplifiers, the distortion generated is due to tube characteristic nonlinearity, transformer nonlinearity, and nonlinear behaviour of the output load. With any type of output device not purely resistive, such as a loudspeaker, a varying impedance will be presented to the output transformer secondary, varying both with frequency and with instantaneous motional position and motional amplitude. The output transformer also will change in impedance characteristics over the working range. The output tube or tubes, therefore, work with an actual load of continuously varying impedance. Considering the characteristics of any type of vacuum power tube, we will find that a change in load impedance causes a change in plate current, plate voltage, power output, voltage amplitude distortion and current amplitude distortion phase, nature and amplitude. In the case of instantaneous impedance variations, as is usually the case with transformers at low frequencies, voltage and current harmonics will be quite different in nature, phase and relative amplitude.

The usual method of reducing distortion by pushpull operation is actually effective over a small part of the frequency range; the other method, use of inverse feedback, leads to difficulties with phase shift and transient distortion. A third method, the use of a second amplifier to generate distortion power to balance distortion generated by the main amplifier, has not found practical application, because no workable method for combining the power of the amplifiers without heavy power losses, impedance mismatching, and without getting a feedback loop has been proposed, and also because the necessity of correcting current distortion as well as voltage distortion was not perceived. In this invention, a solution to these difficulties is demonstrated, and results much superior to previous designs can be attained by the circuits according to this invention.

The basic principles of this invention are the use of a main and a secondary power amplifier, the impression on the input of secondary amplifier of a signal from the output of the main amplifier representing the output power, and the recombination of the two output powers in a manner that the correction signal to the secondary channel input shall not be markedly affected by the secondary amplifier power output. In detail, the principles state that in an amplifying system, there shall be a main power amplifier of any desired kind and a second power amplifier, usually of smaller power rating than the main amplifier. The main purpose of this secondary amplifier is to reduce the distortion output of the entire system, although useful signal power output may also be obtained from it. On the input of this secondary amplifier, a signal voltage is impressed, this voltage being derived from the main amplifier output current and voltage, so as to give a representation of the output power, or from the power output of the output load, and thus contains all the output amplitude distortion components. In addition, undistorted signal voltage from a stage ahead of the main amplifier is impressed on the input of the secondary amplifier in opposition to the signal component of the correction voltage from the main amplifier output, so that the composite input to the secondary power amplifier consists mainly of the harmonics generated by the main amplifier. The secondary amplifier amplifies these harmonics and the drive is adjusted so that the output harmonic power delivered by the secondary amplifier to the output load is equal to the output harmonic power delivered by the main amplifier to the output load, and in opposite phase, so that cancellation will take place. The feedback loop around the secondary amplifier must be minimized, otherwise the system becomes an ordinary feedback amplifier. This is accomplished by the circuits of this invention, by means of novel circuit arrangements utilizing certain properties and modifications of the circuit elements, so as to combine the power output of the two amplifiers without markedly affecting the correction voltage derived from the main power amplifier and impressed on the secondary amplifier.

Figure 1B:
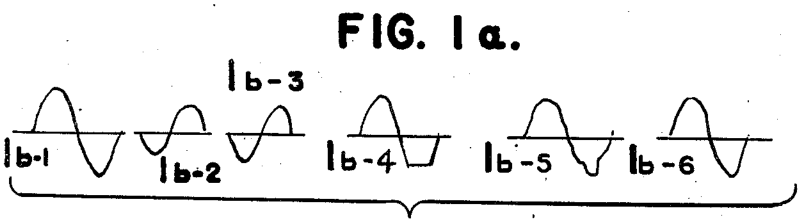
Figure 2:
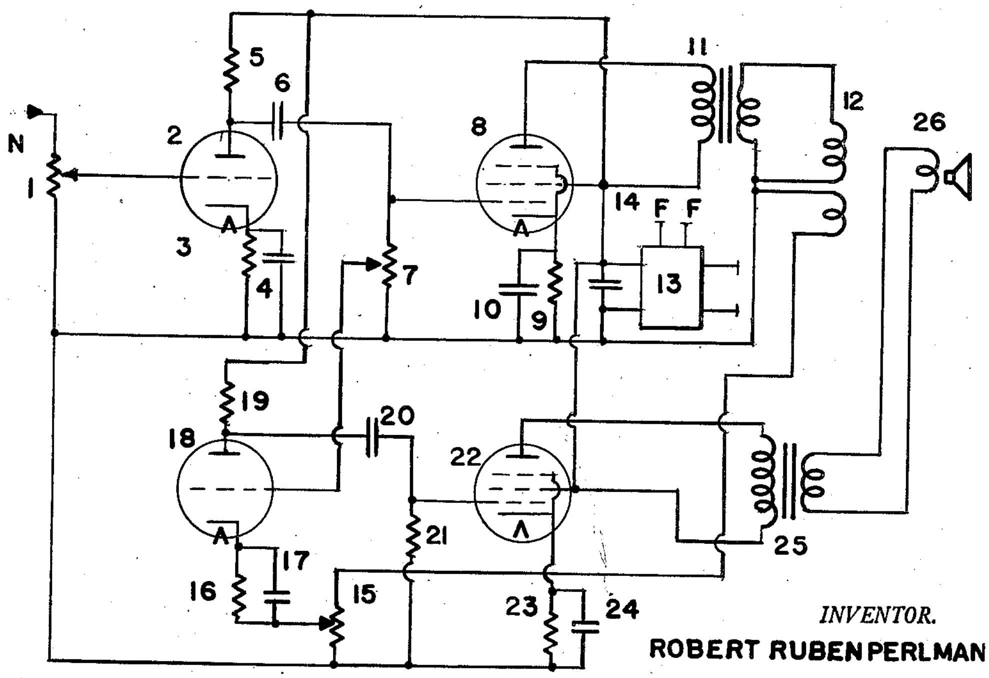
Figure 5A:
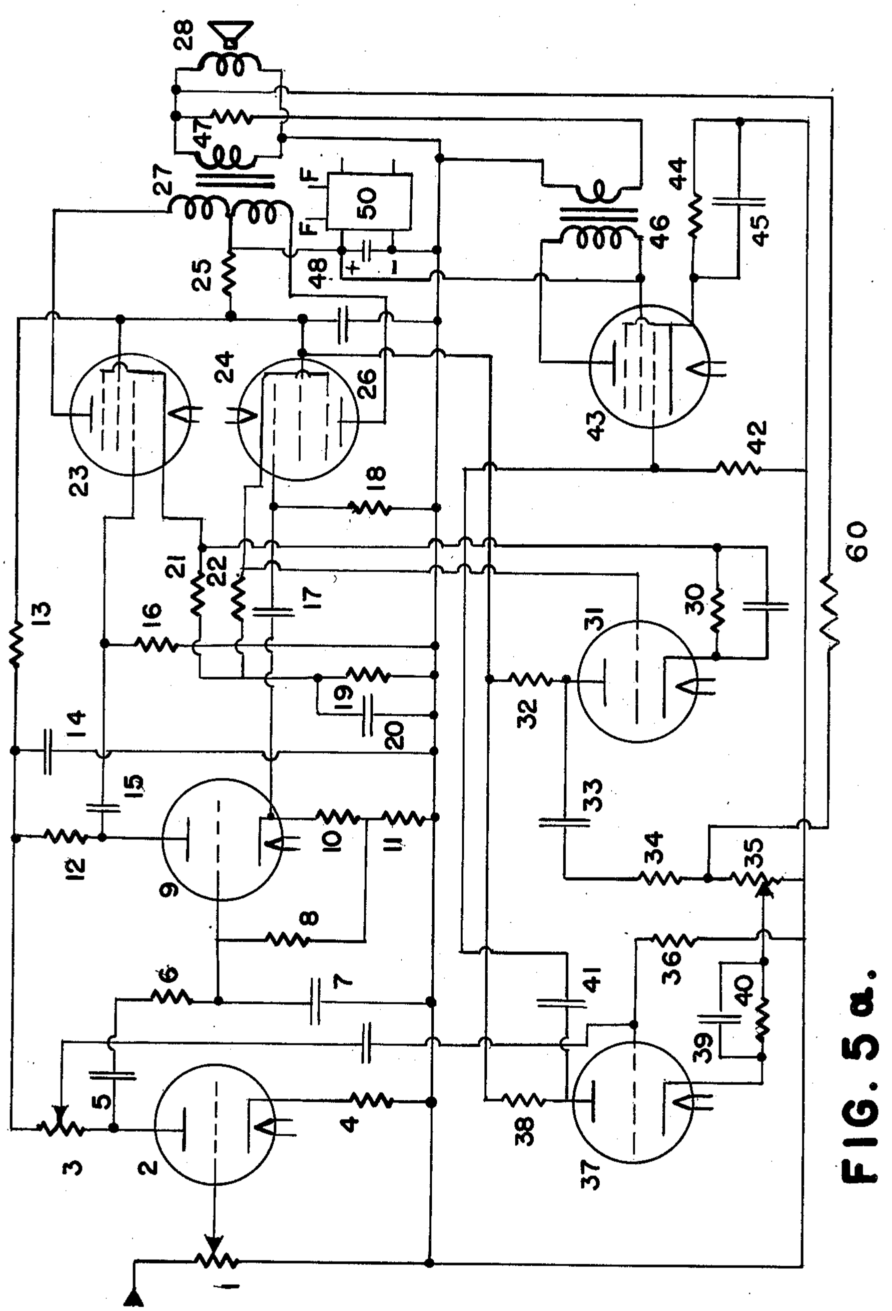
Figure 3:
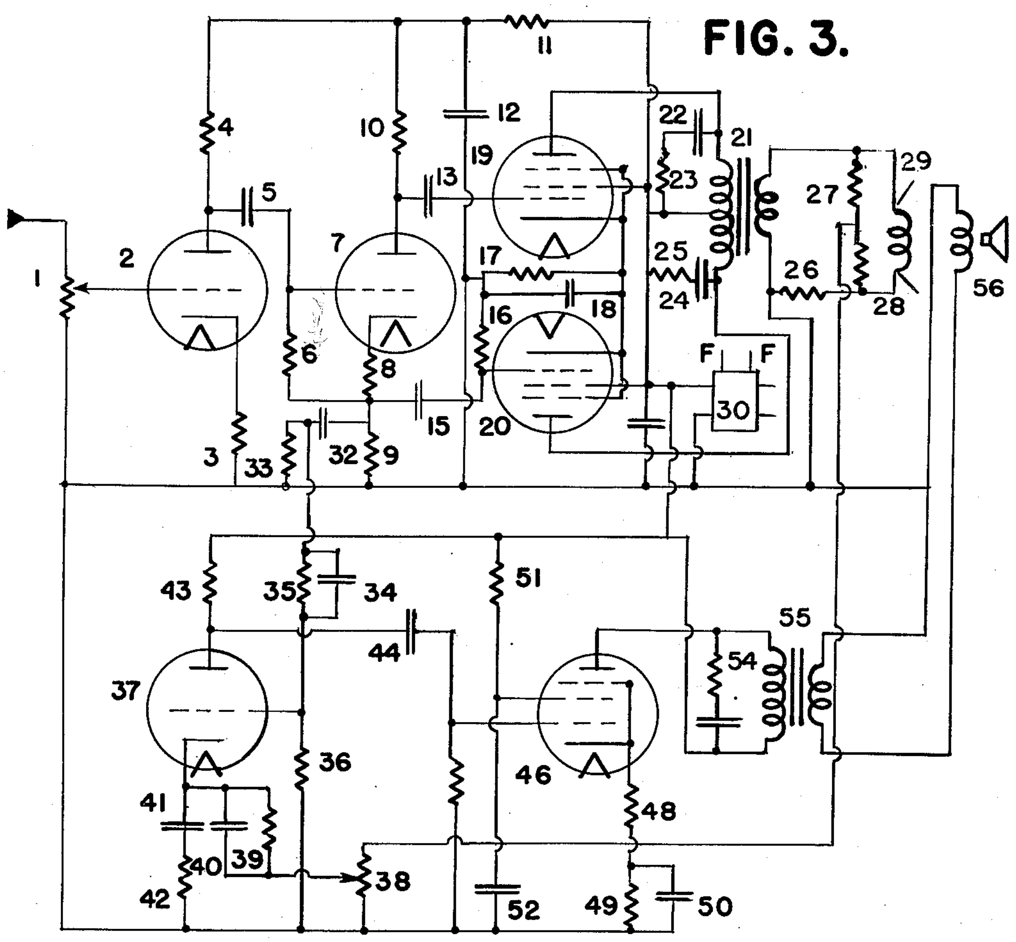
Figure 4:
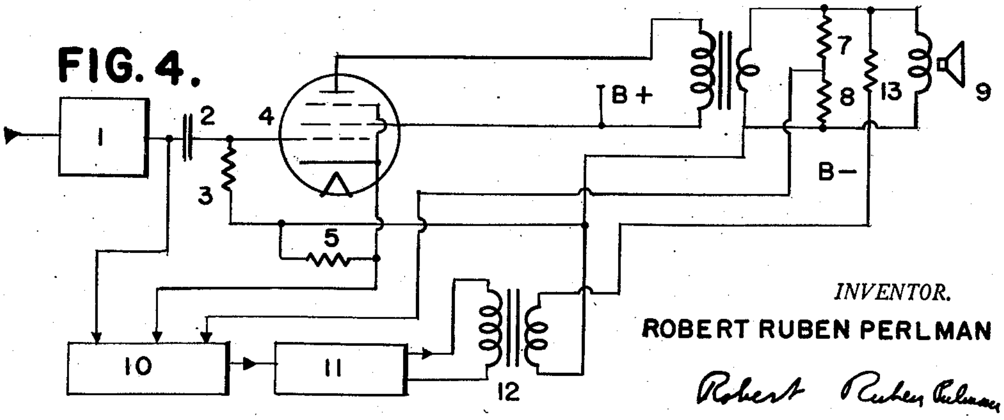
Figures 5B, 5C:
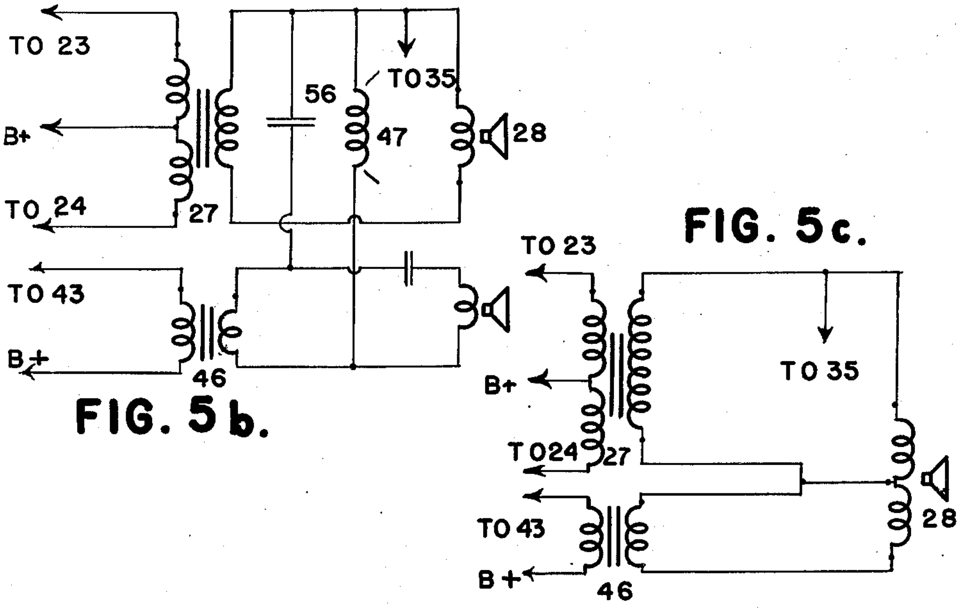
Figure 6:
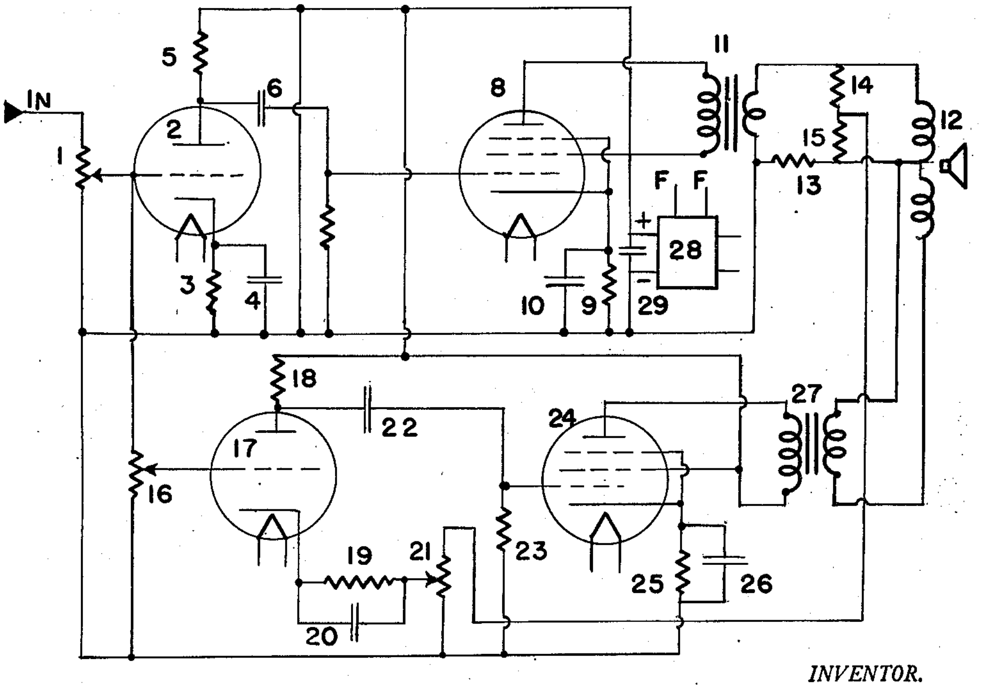

Figure 1*a* shows the basic circuit arrangement of this invention. Figure 1*b* shows the phase relationships of Figure 1*a*. Figure 2 shows a simple practical circuit according to Figure 1, utilizing two separate output devices. Figure 3 shows an elaboration of the circuit of Figure 2. Figure 4 shows the basic circuit arrangement of a circuit according to Figure 1, utilizing a single section output device. Figure 5*a* shows a practical circuit according to Figure 4. Figure 5*b* shows a variation of Figure 5*a* with a woofer-tweeter output arrangement. Figure 5*c* shows the output connection for Figure 5*a*, using a splitcoil speaker system. Figure 6 shows a circuit according to Figure 1, using a single dual section output device of the moving coil type.

Figure 1*a* illustrates the basic principle of this invention. 1 is a source of input signal voltage which is to be amplified in the amplifier system, such as a microphone or a pickup. 2 is the preamplifier section, which raises the signal voltage to the proper level to drive the power amplifier stages, and is of conventional design. 3 is the main power amplifier section, consisting of one or more power amplifier tubes, with the associated output transformer and other components; it can be of any conventional design. The output power of 3 is impressed on the output device 4, which converts the output signal power into the desired output energy, such as sound power. The sections 3 and 4 generate amplitude and frequency distortion, which it is the purpose of this invention to reduce partially or completely. This is accomplished by impressing on the secondary amplifying channel a voltage representing the output current and the output voltage of the main amplifying channel, with the signal component acting in opposition to the undistorted signal voltage impressed on the input of this secondary channel. The secondary channel consists of a mixer stage, in which the various input signals are mixed to give an output signal consisting largely of harmonics generated by the main amplifying channel. The output of the mixer stage is impressed on the secondary power stage which may be one or more tubes, of low or equal power output compared to the main amplifier, and of any conventional design. The secondary channel delivers to the system output harmonic power equal to that generated by the main amplifier channel, and this secondary power is impressed on the output in opposite phase to the main channel harmonics, so that the distortion energy will be reduced by cancellation. The signal output of the two channels is usually added. This method of reducing distortion can only be effective if inverse feedback around the secondary amplifier is reduced to a comparatively low level; otherwise bridge circuits must be used, and these are impractical in power amplifiers. If the inverse feedback around the secondary channel is not reduced, then the correction voltages $E_2$ and $E_3$ will be affected by $P_2$ and it becomes simply an inverse feedback amplifier. This precaution is accomplished by the circuits of this invention by the following means:

1. Two loudspeakers are used, one for the main and one for the secondary channel.
2. A single loudspeaker having two voice coils is used.
3. A single, singlecoil speaker is used, and part or all of the correction voltages are taken at a point in the main channel not affected by the secondary channel.

In all these circuits, the correction signal should be derived from either the output motion of device 4, or from two voltages representing both output voltage and current of the main amplifier. Incomplete correction can, if desired, be obtained by using only voltage or output current only to supply the correction voltage.

In one variation of this amplifier, frequency distortion is deliberately introduced in the main amplifier and corrected by the secondary amplifier.

Figure 1*b* shows the phase relationships in the amplifying system of Figure 1*a*. 1*b*–1 shows the output of stage 2, which is also impressed as $E_1$ on stage 3. 1*b*–2 shows the voltage correction signal from the main channel and 1*b*–3 shows the current correction voltage. 1*b*–4 shows the output voltage of the main amplifier channel and 1*b*–5 shows the output voltage of the secondary channel. 1*b*–6 shows the output energy waveform of the system.

Figure 2 is a simple circuit according to this invention. 1 is a rheostat controlling the signal input to the amplifier system. 2 is a voltage amplifier tube, having a cathode bias resistor 3 by-passed with capacitator 4. 5 is the plate load resistor, and 6 is coupling capacitator transferring the output voltage from 2 to the control grid of power output tube 8 which may be any type of vacuum power tube, and is operated in a conventional manner. 7 is a fixed grid resistor for tube 8, and acts as a rheostat regulating the signal input to the secondary channel. 9 is a cathode bias resistor, bypassed with capacitator 10. The output power of 8 is transferred through transformer 11, which may be of conventional design, to output load 12, which may be a loudspeaker or similar device actuating an airload; it has attached to its moving coil a pickup device, in this case shown as an auxiliary coil moving in the magnetic structure, which converts the output motion of the loudspeaker into a voltage proportional to the output power, and contains all the distortion generated by the tube 8, transformer 11 and load 12. The pickup device may require a loading network, not shown, to secure a flat frequency response. The voltage from the pickup device is impressed on the secondary channel mixer tube in its cathode circuit, through rheostat 15 so phased that its signal component shall oppose the signal grid voltage of tube 18. 16 is a cathode bias resistor, bypassed with capacitator 17. 19 is a plate load resistor and 20 is a coupling capacitator transferring the output of 18, consisting largely of harmonics generated by the main power amplifier, to the control grid of the secondary power amplifier tube 22. 22 may be any kind of power tube, operated under conventional conditions: it has a cathode bias resistor bypassed with capacitator 24, and its output power is transferred through transformer 25, to secondary loudspeaker 26. If 12 is a loudspeaker, then 26 is also a loudspeaker, which may be a smaller size, located in close proximity or coaxially to 12. The adjustment is as follows: if the output of 12 is 10 watts acoustical power, containing 1 watt of the second harmonic then the secondary amplifier, by means of the rheostats 7 and 15, is adjusted to give an output which will radiate 1 watt acoustical power of second harmonic from 26 as well as a small amount of signal energy, if desired. The two speakers are so phased that the distortion output power shall be of opposite phase and cancel. This circuit, which embodies only a part of the principles of this invention, has limited utility, due to the difficulty of matching two loudspeakers to give an accurate balance. Figure 3 shows a variation of Figure 2, in which a more elaborate main amplifier is used, and an ordinary loudspeaker is used as the main load. The driver 2 drives the conventional splitload phase inverter tube 7 which drives the two push pull power tubes 19 and 20. The main output load is loudspeaker 29. The loudspeaker signal current flows through resistor 26, which converts the current into a voltage with respect to ground. To this voltage is added part of the output voltage across the transformer 21 secondary through resistors 27 and 28, so that the voltage and current vectors are of equal amplitude with a resistive load of the rated output impedance. Resistor 26 should have a small resistance compared with the impedance of 29, to minimize power losses; 27 and 28 should be several times the load impedance for the same reason. The composite correction voltage from 29 is impressed on the mixer tube 37 of the secondary channel which drives the secondary output tube 46, which in turn transfers output energy through transformer 55 to secondary load 56. There are some phase shifting networks in the secondary channel, which are optionally used to damp out speaker resonances. It is important to note that in both Figures 2 and 3, there is only negligible coupling from the secondary speaker to the primary speaker due to the low conversion efficiency so that the output energy of the secondary speaker cannot affect the correction voltages to the secondary amplifier input. Local feedback loops may be used to stabilize individual circuit sections, without affecting overall operation.

Figure 4 shows a modification of the circuit of Figure 1, utilizing a single output device, in a compromise arrangement. 1 represents the main amplifier driver stage; 4 is the main amplifier output tube of conventional design, delivering power to the output device 9. The tube signal current is converted into a voltage with respect to ground in resistor 5, and this voltage is impressed on the secondary channel mixer tube 10. Another correction signal, representing the output voltage, is taken from voltage divider resistors 7 and 8, and is also impressed on the secondary channel. The output power of the secondary channel, which is adjusted as explained in Figures 2 and 3, is impressed on the output device 9, through resistor 13, which is from 0.2 to 3 times the load impedance; it serves to prevent loading of the main output transformer by the secondary output transformer secondary 12, which decreases rapidly in impedance with standard transformers, below 100 cycles. Some secondary power is lost in this resistor, but since the distortion power required is only 5 to 10% of the output signal power, the secondary channel can make up this loss. There is some inverse feedback around the secondary channel through $e_3$, but there is almost none through $e_2$, as the high tube resistance of the output tube makes it insensitive to plate voltage variations produced by 11.

Frequency distortion can be deliberately introduced in this and any of the other types of amplifiers of this invention, it being corrected in the secondary amplifier. This can be done for reasons such as to amplify high frequency signals only in the secondary channel and low frequencies in the main channel. Figure 5*a* shows a practical circuit, utilizing the second channel as a distortion reduction channel according to this invention, as well as the main amplifier at high frequencies. This is an advantageous arrangement, as the low frequencies are better reproduced by a high power pushpull amplifier, the distortion being removed by the second channel, while at high frequencies where the power is very low, at a maximum perhaps 5% of the low frequency power of music or speech material, a single ended, small amplifier gives better results. In addition, this arrangement eliminates intermodulation of the weak high frequency signals by the heavy bass sounds. 1 is a source of input signal, 2 is a conventional driver stage, driving a conventional splitload phase inverter 9 which drives two pushpull power tubes 23 and 24 such as the 6V6 type, 16 and 18 are the grid return resistors, while resistor 6 and capacitator 7 are a phase shifting network which attenuates the high frequencies. The 3 db point is usually between 500 and 3000 cycles. A two-section network can also be used. In the cathode circuit, we find cathode bias resistor 19, bypassed with a large bypass capacitator 20. 21 and 22 are two small equal resistors, about 10–25% of 16, which convert the cathode current of each tube into a voltage which is transferred to the second amplifier. 27 is any suitable output transformer, driving load 20, which may be a loudspeaker, cutting head etc. This second amplifier is composed of tubes 31, 37 and 43. 31 is a summing amplifier, which adds the two cathode currents in pushpull, 30 is a cathode bias resistor tube 37 receives undistorted signal voltage from driver 2, through balancing potentiometer 3, and output voltage from 31 through voltage divider reistor 34. It also receives output voltage from 28. The combined signals are added in the potentiometer 35, in which the signal voltage component is reduced at low frequencies due to cancellation, and transferred to tube 43, which is a power tube, such as the 6V6 type, under usual class A conditions, whose output power is transferred to the load 28 through transformer 46 and resistor 47. Resistor 47 is from 20% to 300% of the nominal output impedance. The pots and contents are so adjusted that at low frequencies, tube 43 receives only distortion input, while at high frequencies its power should be equal or down 1 to 3 db to that of the main amplifier, so as to give a reasonably flat characteristic. At low frequencies, the distortion power delivered by 43 should be equal to the distortion power generated by the main amplifier. There is a minor feedback loop, but is unimportant. Figure 5*b* shows the output connections when using a separate woofer and tweeter speaker. The low frequency distortion power generated by 43 is transferred to the woofer 28 through choke coil 47 which also functions as resistor 47 of 5*a*; the tweeter 53 receives power only from 43 through capacitator 52.

Figure 5*c* shows the output connections to a split coil loudspeaker or similar device as described in Figure 6 in this application. Figure 6 shows a variation of the circuit of Figure 1, utilizing a single output device of the moving coil type. 1 is the input controlling potentiometer, across which the input voltage is impressed; 2 is a conventionally operated driver tube, having a cathode bias resistor 3 bypassed by capacitator 4, and a plate load resistor 5. The output signal voltage of 2 is transferred to the control grid of the main power amplifier tube 8, which may be any kind of power tube, but is in this case shown as a beam tetrode, and is operated in a conventional manner. 9 is a cathode bias resistor bypassed with capacitator 10, and 11 is the output transformer which transfers the output power of 8 to section $L_a$ of the output device 12. This device is a loudspeaker or similar device in which electric energy is transformed into motion by a moving coil attached to a mechanical load, moving in a magnetic field. The coils $L_a$ and $L_b$ are rigidly interconnected, so that the output motion is the sum of the energy in both coils. They can be a single tapped coil, a two layer coil, etc. A part of the signal input voltage is transferred to the secondary channel mixer tube 17 through potentiometer 16. Tube 17 also receives, in its cathode circuit, a correction voltage obtained from the output voltage and current in coil $L_a$. The signal component in the correction signal is phased in opposition to the input from 16, so that the output of 18 is mainly distortion. Resistor 13 is the current indicating resistor and 14 and 15 a voltage divider, functioning as previously explained in Figure 3. 21 is a balancing potentiometer for adjusting the amount of correction voltage impressed on 18. 19 is a cathode bias resistor and 20 a bypass capacitator. The output of tube 17 is transferred to the control grid of the secondary power tube 24, which may deliver from 5 to 90% of the power of the main amplifier tube. It has a grid resistor 23, bias resistor 25, bypassed with capacitator 26.

The output power of tube 24 is impressed on coil $L_b$ of load 12 through transformer 27. Coils $L_a$ and $L_b$ are so phased that the signal energy in both shall add; this will ensure that the harmonic power shall cancel. The potentiometers are adjusted to reduce the distortion in the output motion to a minimum by making the harmonic power equal in both coils. It is important to note that although the two output coils are in close proximity and acting together, the power transfer from $L_b$ to $L_a$ due to inductive coupling and motional induction, is so small that the correction voltages taken from $L_a$ are only slightly affected. This is due to the low efficiency of the loudspeaker, and of the magnetic circuit. In other words, there is no effective inverse feedback loop around the secondary channel, so that it is possible actually to reverse the distortion or the motion of the device, by increasing the correction signal to the secondary amplifier, beyond the point of minimum distortion. This circuit offers easy and accurate reduction for the distortion generated by the amplifier tubes, but does not eliminate all of the motional distortion produced by the output device.

It may also be desirable, in the various systems previously discussed, to operate the main amplifier beyond cutoff conditions; the secondary amplifier will then function as a straight amplifier at low levels, and as a correction amplifier at high signal levels. This has advantages, as it is known that at low levels, single ended class A operation is superior to class B operation.

What is claimed is:

1. In an electrical amplifier system generating mechanical power as its useful output, said system including a main amplifier channel and an auxiliary amplifier channel, means to reduce the distortion in the output energy of said system, said means comprising a first and a second output device of similar nature arranged to combine their mechanical output energy by proximity or mechanical coupling, said means further including electrical connections impressing the electrical output energy of said main amplifier channel upon said first output device, electrical connections impressing the electrical power output of said auxiliary amplifier channel upon said second output device, and electrical connections from said first output device to the input of said auxiliary amplifier channel, said auxiliary channel amplifying distortion generated by said main amplifier channel and means for impressing said distortion in equal power and of opposite phase upon said second output device, thereby reducing the distortion of said system.

2. In an amplifying system according to claim 1, an output device comprised of a loudspeaker having two electrically separate voice coils acting as said first and second output devices, said coils actuating a single diaphragm.

3. In an amplifying system according to claim 1, means to reduce distortion, said means comprising frequency discriminating networks in said main and said auxiliary amplfier channels, thereby reducing the amplification of said main amplifier channel at the higher portion of the frequency range of said system, said auxiliary amplifier thereby being caused to act as the main amplifier channel at said higher frequencies.

References Cited in the file of this patent

UNITED STATES PATENTS

| | | |
|---|---|---|
| 2,252,049 | Terman | Aug. 12, 1941 |
| 2,393,936 | Romander | Jan. 29, 1946 |
| 2,554,279 | Tharp | May 22, 1951 |
| 2,687,935 | Cannon | Aug. 31, 1954 |